(12) United States Patent
Ryu et al.

(10) Patent No.: US 6,376,002 B1
(45) Date of Patent: Apr. 23, 2002

(54) METHOD FOR PREPARATION OF MULBERRY LEAF POWDER AND ICE CREAM CONTAINING THEREOF

(75) Inventors: Kang-Sun Ryu, Ansan-si; Hyun Bok Kim, Suwon-si; Sun Yeou Kim, Kwacheon-si; Heui Sam Lee, Suwon-si; Yong Ki Lee, Suwon-si; Yong Woo Lee, Suwon-si; Soo-Ho Lim, Suwon-si; Woon-Young Choung, Icheon-si, all of (KR)

(73) Assignees: Hong Young Food Co., Ltd., Choongchungbuk-do; Republic of Korea Represented by Rural Development Administration, Kyunggi-do, both of (KR)

( * ) Notice: Subject to any disclaimer, the term of this patent is extended or adjusted under 35 U.S.C. 154(b) by 3 days.

(21) Appl. No.: 09/592,571

(22) Filed: Jun. 12, 2000

(30) Foreign Application Priority Data

Aug. 5, 1999 (KR) ............................................. 99-32108

(51) Int. Cl.$^7$ ................................................. A23G 9/00
(52) U.S. Cl. ........................ 426/565; 426/509; 426/519; 426/524; 426/586; 426/650
(58) Field of Search ................................. 426/565, 586, 426/650, 509, 519, 524

(56) References Cited

U.S. PATENT DOCUMENTS

| 5,238,692 A | * | 8/1993 | Taga et al. |
| 5,445,839 A | * | 8/1995 | Hagiwara et al. |
| 5,612,074 A | * | 3/1997 | Leach |
| 5,645,876 A | * | 7/1997 | Subramaniam et al. |
| 5,876,773 A | * | 3/1999 | Hagiwara |
| 6,022,573 A | * | 2/2000 | Hagiwara |

FOREIGN PATENT DOCUMENTS

| CN | 1078603 | * | 11/1993 |
| JP | 09135671 | * | 3/1997 |
| JP | 10265397 | * | 10/1998 |

OTHER PUBLICATIONS

Marshall and Arbuckle, "Ice Cream", fifth edition, pp. 139–141, 158, 160, 166, 167 (1996).*

* cited by examiner

Primary Examiner—Nina Bhat
(74) Attorney, Agent, or Firm—Shanks & Herbert

(57) ABSTRACT

The present invention relates to a method for preparing mulberry leaf powder and ice cream containing thereof. More particularly, the present invention could provide a method for preparing mulberry leaf powder by blanching mulberry leaf in an aqueous solution containing 0.05~0.5% of sodium bicarbonate, and drying and pulverizing said mulberry leaf. And ice cream of the present invention is prepared by mixing said mulberry leaf powder in an amount of 0.5~5% by weight of the total ice cream with the mix base for ice cream. The ice cream products containing mulberry leaf powder of the present invention are functional as well as palatable.

9 Claims, No Drawings

METHOD FOR PREPARATION OF MULBERRY LEAF POWDER AND ICE CREAM CONTAINING THEREOF

BACKGROUND OF THE INVENTION

1. Field of the Invention

The present invention relates to a functional ice cream. In particular, it relates to a method for preparation of mulberry leaf powder and ice cream containing thereof.

2. Description of the Related Arts

Recently, increased concern about health has driven people to pick up foods having functionality. Among many useful plants and herbs, mulberry, in particular its leaf, attracts people and researchers, because it is known to exert medicinal effect such as depression of blood sugar level, blood pressure and cholesterol level and anti-oxidation action. It has been reported that mulberry leaf has very low content of lipids while it contains water, carbohydrates, proteins and 25 different kinds of amino acids. Among them, alanine, asparaginic acid and glutamic acid which are useful for eliminating hangover are contained abundantly high, and serine and tyrosine, which improves blood circulation in brain and prevents senile-related symptoms, are contained in amounts of 1.2% and 0.8%, respectively. Furthermore, it is rich in various minerals: 60 times of calcium content, 160 times of iron content and 10 times of sphorous content compared to the minerals contained in radish; and 6 times of calcium content, 2 times of iron content and 1.4 times of potassium content compared to those contained in green tea.

Mulberry leaf was employed for producing tea products, noodle, drinks, liquid extract and the like. However, there is no ice cream containing mulberry leaf powder or extract until now. Taste and softness of ice cream may slightly be changed depending on the milk content, since milk is main ingredient. However, what makes the ice cream palatable foods is flavoring agents such as vanilla, strawberry, chocolates, almond nuts, confectionary or coffee flavors.

Though products having functionality as well as palatability are required to meet the consumer's recent preference for functional natural foods, it if not easy to make ice cream having both functionality and palatability because ice cream is one of very palatable foods.

Thus, the present inventors made an attempt to produce the mulberry leaf-containing ice cream retaining its original palatability while revealing functionality derived from mulberry leaf. The palatability of ice cream products on the market is largely dependent on the taste and flavor attributed to additives such as vanilla, fruits (e.g., strawberry), chocolates and the like. Since the mulberry leaf has a characteristic smell of "green," it is not easy to manufacturing non smelly ice creams, which will attract consumers.

After an extensive research to solve above problems, and as a result thereof, we, the present inventors, found that it was possible to prepare mulberry leaf powder suitable for producing functional, palatable ice cream by blanching mulberry leaf in an aqueous solution containing 0.05–0.5% of sodium bicarbonate.

SUMMARY OF THE INVENTION

Mulberry leaf powder of the present invention is prepared by mixing in a ratio of 1:1 a mulberry leaf powder (A) prepared by blanching a mulberry leaf in an aqueous solution containing 0.05–0.5% of sodium bicarbonate, drying and pulverizing said mulberry leaf to give a powder of 100–300 mesh and a mulberry leaf powder (B) prepared by pretreating a mulberry leaf with $N_2$ gas and pulverizing said mulberry leaf to give a powder of 100–300 mesh.

And, the mulberry leaf ice cream of the present invention is prepared by a method comprising the steps of:

(a) preparing and blanching a mulberry leaf in an aqueous solution containing 0.05–0.5% of sodium bicarbonate, and drying and pulverizing said mulberry leaf to give a powder of 100–300 mesh;

(b) mixing said mulberry leaf powder from said step (a) with mulberry leaf powder prepared by a process comprising pretreating a mulberry leaf with $N_2$ gas and pulverizing said $N_2$ gas-pretreated mulberry leaf to give a powder of 100–300 mesh, wherein the blanched mulberry leaf powder from step (a) and the $N_2$ gas-pretreated mulberry powder are mixed in a ratio of 1:1;

(c) preparing a mix base for ice cream and homogenizing it;

(d) mixing said homogenized mix base with the mulberry leaf powder resulting from step (b) and flavors; and (e) aging the resulting mixture followed by freezing and thickening to give mulberry leaf powder containing ice cream.

The present invention further provides mulberry leaf ice cream prepared by the above method.

The present invention will be described in detail below.

DETAILED DESCRIPTION OF THE INVENTION

According to the method of the present invention, mulberry leaf is blanched in an aqueous solution containing 0.05–0.5% of sodium bicarbonate to eliminate the "smell" of greens while retaining its natural color. Then, it is dried and pulverized to give powder. Although, the particle size of the powder is not particularly limited, it is preferable to make the size of the particles in a range of 100–300 mesh in the light of texture and feel of the final ice cream into which the powder is incorporated.

Because the heat transferred during blanching process easily destroy bio-active ingredients (secondary metabolites) such as rutin and GABA, special treatment (additional treatment) is required. One solution to this problem is to use anaerobically treated mulberry leaf powder. $N_2$ treatment is one of the popular methods. In this method, the blanched mulberry leaf powder can be mixed with the $N_2$-treated powder with the ratio of 1:1.

The mulberry leaf ice cream of the present invention contains mulberry leaf powder or mixed mulberry leaf powder (hereinafter, referred to as "powder" sometimes) in an amount of 0.5~5% by weight of the total ice cream.

The ice cream mix base which is mixed with the powder is well known to those who are skilled in the art, and, for example, is comprised of skim milk powder, raw cream, sugar, hardened coconut oil and the like. After the mix base is mixed with powder, the resulting mixture is aged and frozen to prepare the final ice cream according to the well-known process.

The typical method for preparation of the ice cream containing mulberry leaf powder will be described in detail hereinafter.

The step (a) is to prepare and blanch mulberry leaf in an aqueous solution containing 0.05~0.5% of sodium bicarbonate, and dry and pulverize said mulberry leaf to give powder of 100~300 mesh.

After harvesting mulberry leaves with good quality, they are washed throughly in the water and are blanched in 0.05~0.5%, preferably in an aqueous solution containing 0.15% of sodium bicarbonate at the approximate temperature of 75~85° C.

Next, after the blanched leaves were washed with cold water, the moisture is eliminated. They are then dried either under a well-ventilated shade or in the drier at the temperature of 65~68° C. for the first 20~40 minutes and then at the temperature of 45~50° C. after emitting the residual moisture inside the drier.

The pulverization may be carried out by a known method using, for example, ball mill or air jet mill, and the pulverized mulberry leaf particles are filtered to obtain powder of 100~300 mesh.

The step (b) is to prepare a mix base for ice cream and homogenizing it;

The mix base for palatability of the ice cream contains mixed skim milk powder, high-milled sugar, ice sugar, combined water glucose, emulsifying stabilizer, refined salt and purified water, and optionally raw cream or hardened coconut oil. The mix base is mixed with stirring for 10~60 minutes at the temperature of 40~90° C. After filtering and homogenizing the mix base under 10~200 kg/cm$^2$, the mix base is sterilized at the temperature of 70~100° C. for 10~60 seconds and cooled down to 2~6° C.

The step (c) is to mix said homogenized mix base with said powder and flavors.

After moving the sterilized mix base into tank, the mulberry leaf powder and flavors are added thereto and mixed together.

The step (d) is to age the resulting mixture followed by freezing and thickening to give mulberry leaf powder containing ice cream.

After aging the resulting mixture at the temperature of 1~10° C. for 1~20 hours, it is frozen at the temperature of −4~−8° C. and then thickened at the rate of 10~200%, preferably 50~150%.

Then the ice cream contents can be packed in a conventional way. For example, an automatic charger is used to pack the contents into a cup-shaped packing container. Inside of the container was made of ethylene resin, which becomes the desired shape at the temperature of −4~−6° C. The bar-type products, which may contain fillers such as adzuki bean syrups, strawberry syrups and the like, can also be manufactured by packaging and hardening the ice cream contents at the temperature of −38~−52° C. for 30~90 minutes, and store the ice cream at the temperature of −20~−30° C.

The present invention will be described in the 12 examples and 3 experimental examples, but it should not be interpreted that the present invention to be limited to these examples.

EXAMPLE 1

After washing throughly in the water, mulberry leaf was blanched in an aqueous solution containing 0.05~0.5% of sodium bicarbonate for 10~60 minutes., and dried and pulverized to obtain the powder of 100~300 mesh.

After homogenizing the mix base comprising 23% of raw cream, 10% of skim milk powder, 5% of ice sugar, 2.0% of combined water glucose, 0.4% of emulsifying stabilizer (guar gum 22.5%, locust bean gum 19.5%, carrageenan 4.5%, tamarind gum 3.5%, glycerin fatty acid ester 50%), 0.03% of refined salt, 11% of high-milled sugar, and 47.39% of purified water, 1.0% of above prepared mulberry leaf powder and 0.18% of vanilla flavor were added thereto and mixed. Then, the resulting mixture was aged followed by freezing and thickening to give ice cream having fat.

EXAMPLE 2

Mulberry leaf, immediately after harvesting, was stored in a closed chamber, where nitrogen gas was charged, for about 5 hours. Then the leaf was washed, dried, pulverized, and filtered to give powders of 100~300 mesh.

By mixing mulberry leaf powder prepared by the process in EXAMPLE 1 with mulberry leaf powder prepared in this EXAMPLE 2 in a ratio of 1:1, the mixed mulberry leaf powder was prepared.

After homogenizing the mix base comprising 18% of raw cream, following ingredient were added thereto and mixed: 11% of skim milk powder, 6% of ice sugar, 0.2% of emulsifying stabilizer(guar gum 22.5%, locust bean gum 19.5%, carrageenan 4.5%, tamarind gum 3.5%, glycerin fatty acid ester 50%), 10% of high-milled sugar, and 54.1% of purified water, 0.5% of above prepared mulberry leaf powder and 0.2% of vanilla flavor were added thereto and mixed. Then, the resulting mixture was aged followed by freezing and thickening to give ice cream having fat.

EXAMPLE 3

After homogenizing the mix base comprising 23% of raw cream, following ingredient were added thereto and mixed: 10% of skim milk powder, 5% of ice sugar, 2.0% of combined water glucose, 0.4% of emulsifying stabilizer (guar gum 22.5%, locust bean gum 19.5%, carrageenan 4.5%, tamarind gum 3.5%, glycerin fatty acid ester 50%), 0.03% of refined salt, 11% of high-milled sugar and 47.39% of purified water, 1.0% of the mixed mulberry leaf powder prepared by the process in EXAMPLE 2 and 0.2% of vanilla flavor were added thereto and mixed. Then, the resulting mixture was aged followed by freezing and thickening to give ice cream having fat.

EXAMPLE 4

After homogenizing the mix base comprising 26% of raw cream, following ingredient were added thereto and mixed: 9% of skim milk powder, 7% of ice sugar, 1.0% of combined water glucose, 0.5% of emulsifying stabilizer(guar gum 22.5%, locust bean gum 19.5%, carrageenan 4.5%, tamarind gum 3.5%, glycerin fatty acid ester 50%), 0.05% of refined salt, 12% of high-milled sugar and 42.75% of purified water, 1.5% of the mixed mulberry leaf powder prepared by the process in EXAMPLE 2 and 0.2% of vanilla flavor were added thereto and mixed. Then, the resulting mixture was aged followed by freezing and thickening to give ice cream having fat.

EXAMPLE 5

After homogenizing the mix base comprising 29% of raw cream(35%), 8% of skim milk powder, 4% of ice sugar, 2.5% of combined water glucose, 0.6% of emulsifying stabilizer(guar gum 22.5%, locust bean gum 19.5%, carrageenan 4.5%, tamarind gum 3.5%, glycerin fatty acid ester 50%), 0.04% of refined salt, 13% of high-milled sugar and 40.71% of purified water, 2.0% of the mixed mulberry leaf powder prepared by the process in EXAMPLE 2 2.0% and 0.15% of vanilla flavor 0.15% were added thereto and mixed. Then, the resulting mixture was aged followed by freezing and thickening to give ice cream having fat.

EXAMPLE 6

After homogenizing the mix base comprising 35% of raw cream(35%), 7% of skim milk powder, 5% of ice sugar, 3.0% of combined water glucose, 0.3% of emulsifying stabilizer(guar gum 22.5%, locust bean gum 19.5%, carrageenan 4.5%, tamarind gum 3.5%, glycerin fatty acid ester 50%), 0.02% of refined salt, 9% of high-milled sugar and 38.08% of purified water, 2.5% of the mixed mulberry leaf powder prepared by the process in EXAMPLE and 0.1% of vanilla flavor were added thereto and mixed. Then, the resulting mixture was aged followed by freezing and thickening to give ice cream having fat.

Experimental Example 1

We took a sensory test employing a panel of judges organized with 15 experienced persons for ice creams of Example 1~6. The test was performed by asking the panel to choose one in the nine scale, and the results are shown in Table 1 below.

TABLE 1

| Ice cream having fat | Items for sensory test | | | |
| --- | --- | --- | --- | --- |
| | Taste | Color | Feel of composition | Total palatability |
| Ex. 1 | 7.80 | 8.15 | 7.55 | 7.83 |
| Ex. 2 | 7.45 | 7.28 | 7.14 | 7.30 |
| Ex. 3 | 8.34 | 8.37 | 8.21 | 8.32 |
| Ex. 4 | 8.01 | 8.39 | 8.05 | 8.15 |
| Ex. 5 | 8.15 | 8.28 | 8.12 | 8.18 |
| Ex. 6 | 8.21 | 8.20 | 7.87 | 8.13 |

From the result shown in Table 1, it was confirmed that ice cream of Example 3 was most palatable.

EXAMPLE 7

After homogenizing the mix base comprising 12% of high-milled sugar, 10% of hardened coconut oil, 9% of skim milk powder, 6% of ice sugar, 0.2% of emulsifying stabilizer (guar gum 22.5%, locust bean gum 19.5%, carrageenan 4.5%, tamarind gum 3.5%, glycerin fatty acid ester 50%) and 62.1% of purified water, 0.5% of mulberry leaf powder prepared by the process in EXAMPLE 1 and 0.2% of vanilla flavor were added thereto and mixed. Then, the resulting mixture was aged followed by freezing and thickening to give non-dairy fat ice cream.

EXAMPLE 8

After homogenizing the mix base comprising 12% of high-milled sugar, 10% of hardened coconut oil, 9% of skim milk powder, 6% of ice sugar, 0.2% of emulsifying stabilizer (guar gum 22.5%, locust bean gum 19.5%, carrageenan 4.5%, tamarind gum 3.5%, glycerin fatty acid ester 50%) and 62.1% of purified water, 0.5% of the mixed mulberry leaf powder prepared by the process in EXAMPLE 2 and 0.2% of vanilla flavor were added thereto and mixed. Then, the resulting mixture was aged followed by freezing and thickening to give non-dairy fat ice cream.

EXAMPLE 9

After homogenizing the mix base comprising 11% of high-milled sugar, 9.5% of hardened coconut oil, 10% of skim milk powder, 5% of ice sugar 5%, 0.4% of emulsifying stabilizer(guar gum 22.5%, locust bean gum 19.5%, carrageenan 4.5%, tamarind gum 3.5%, glycerin fatty acid ester 50%), 0.03% of refined salt, 2.0% of combined water glucose and 60.89% of purified water, 1.0% of the mixed mulberry leaf powder prepared by the process in EXAMPLE 2 and 0.18% of vanilla flavor were added thereto and mixed. Then, the resulting mixture was aged followed by freezing and thickening to give non-dairy fat ice cream.

EXAMPLE 10

After homogenizing the mix base comprising 10% of high-milled sugar, 12% of hardened coconut oil, 11% of skim milk powder, 4% of ice sugar, 0.3% of emulsifying stabilizer(guar gum 22.5%, locust bean gum 19.5%, carrageenan 4.5%, tamarind gum 3.5%, glycerin fatty acid ester 50%), 0.02% of refined salt, 1.0% of combined water glucose and 59.98% of purified water, 1.5% of the mixed mulberry leaf powder prepared by the process in EXAMPLE 2 and 0.2% of vanilla flavor were added thereto and mixed. Then, the resulting mixture was aged followed by freezing and thickening to give non-dairy fat ice cream.

EXAMPLE 11

After homogenizing the mix base comprising 9% of high-milled sugar, 10.5% of hardened coconut oil, 12% of skim milk powder, 7% of ice sugar, 0.5% of emulsifying stabilizer(guar gum 22.5%, locust bean gum 19.5%, carrageenan 4.5%, tamarind gum 3.5%, glycerin fatty acid ester 50%), 0.04% of refined salt, 3.0% of combined water glucose and 55.81% of purified water, 2.0% of the mixed mulberry leaf powder prepared by the process in EXAMPLE 2 and 0.15% of vanilla flavor were added thereto and mixed. Then, the resulting mixture was aged followed by freezing and thickening to give non-dairy fat ice cream.

EXAMPLE 12

After homogenizing the mix base comprising 13% of high-milled sugar, 11% of hardened coconut oil, 10% of skim milk powder, 8% of ice sugar, 0.6% of emulsifying stabilizer(guar gum 22.5%, locust bean gum 19.5%, carrageenan 4.5%, tamarind gum 3.5%, glycerin fatty acid ester 50%), 0.05% of refined salt, 4.0% of combined water glucose and 50.75% of purified water, 2.5% of the mixed mulberry leaf powder prepared by the process in EXAMPLE 2 and 0.1% of vanilla flavor were added thereto and mixed. Then, the resulting mixture was aged followed by freezing and thickening to give non-dairy fat ice cream.

Experimental Example 2

We took a sensory test employing a panel of judges organized with 15 experiences persons for ice creams of Example 7~12. The test was performed by asking the panel to choose one in the nine scale and the results are shown in Table 2 below.

TABLE 2

| Non-fat ice cream | Items for sensory test | | | |
| --- | --- | --- | --- | --- |
| | Taste | Color | Feel of composition | Total palatability |
| Ex. 7 | 8.09 | 8.11 | 7.54 | 7.91 |
| Ex. 8 | 8.41 | 8.33 | 7.87 | 8.21 |
| Ex. 9 | 8.52 | 8.43 | 8.46 | 8.47 |
| Ex. 10 | 8.38 | 8.17 | 8.15 | 8.23 |
| Ex. 11 | 7.63 | 8.04 | 7.39 | 7.70 |
| Ex. 12 | 7.44 | 7.15 | 7.31 | 7.30 |

From the result shown in Table 2, non-dairy fat ice cream of Example 9 was most palatable.

Experimental Example 3

We took a test for each inhibitory effect against increasing blood sugar by employing 10 persons at the age of twenties after providing them with the conventional ice cream, the above prepared ice creams of Example 1 and 2. Blood sugar level was measured before eating each ice cream ($b_1$, $b_2$ and $b_3$) and 45 minutes after eating each ice cream ($a_1$, $a_2$ and $a_3$), and the change rate of blood sugar ($r_n$; n is an integer from 1~3) was calculated by the following Equation 1. The results are shown in Table 3 below.

$$r_n(\%) = (a_n - b_n)/b_n \times 100 (n \text{ is an integer from } 1\text{~}3) \qquad \text{[Equation 1]}$$

TABLE 3

| | Conventional ice-cream | | | Example 1 | | | Example 2 | | |
|---|---|---|---|---|---|---|---|---|---|
| Volunteer | Before eating (b₁) | 45 min. after eating (a₁) | Change rate of blood sugar (r₁) | Before eating (b₂) | 45 min. after eating (a₂) | Change rate of blood sugar (r₂) | Before eating (b₃) | 45 min. after eating (a₃) | Change rate of blood sugar (r₃) |
| 1 | 85 | 119 | +40 | 133 | 127 | −5 | 127 | 101 | −20 |
| 2 | 62 | 107 | +73 | 105 | 123 | +17 | 113 | 135 | +19 |
| 3 | 65 | 127 | +95 | 135 | 115 | −15 | 127 | 136 | +7 |
| 4 | 108 | 113 | +5 | 104 | 119 | +14 | 114 | 106 | −7 |
| 5 | 89 | 108 | +21 | 133 | 121 | −9 | 108 | 106 | −2 |
| 6 | 94 | 93 | −1 | 101 | 88 | −13 | 112 | 103 | −8 |
| 7 | 93 | 91 | −2 | 120 | 114 | −5 | 105 | 108 | +3 |
| 8 | 104 | 111 | +7 | 101 | 88 | −13 | 112 | 98 | −12 |
| 9 | 82 | 101 | +23 | 88 | 105 | +19 | 111 | 120 | +8 |
| 10 | 92 | 108 | +17 | 105 | 108 | +3 | 105 | 101 | −4 |
| Average | | | 27.8 | | | −1.0 | | | −1.6 |

*Change rate: + = increase, − = decrease

As can be seen in Table 3, the rate change of blood sugar for general ice cream was increased by 27.8%, but both rates change of blood sugar for mulberry leaf powder ice cream of Example 1 and mixed mulberry leaf powder ice cream were decreased.

Though the present invention described with regard to its preferred embodiments, one who are skilled in the art will appreciate from a reading of this disclosure that various change in form and detail can be made without departing from the scope and spirit of the invention.

What is claimed is:

1. A method for preparing mulberry leaf powder comprising mixing (A) a mulberry leaf powder prepared by blanching a mulberry leaf in an aqueous solution containing 0.05–0.5% of sodium bicarbonate, drying and pulverizing said blanched mulberry leaf to give a powder of 100–300 mesh; and (B) a mulberry leaf powder prepared by pretreating a mulberry leaf with $N_2$ gas and pulverizing said $N_2$ gas-pretreated mulberry leaf to give a powder of 100–300 mesh, wherein the powder (A) and the powder (B) are mixed in a ratio of 1:1.

2. Ice cream product containing mulberry leaf powder prepared by the method according to claim 1.

3. A method for preparing mulberry leaf ice cream comprising:
   (a) preparing a mulberry leaf powder by blanching mulberry leaf in an aqueous solution containing 0.05–0.5% of sodium bicarbonate, drying and pulverizing said blanched mulberry leaf to give powder of 100–300 mesh;
   (b) mixing said blanched mulberry leaf powder from said step (a) with mulberry leaf powder prepared by a process comprising pretreating a mulberry leaf with $N_2$ gas and pulverizing said $N_2$ gas-pretreated mulberry leaf powder to give a powder of 100–300 mesh, wherein the mulberry powder from step (a) and the $N_2$ gas-pretreated mulberry powder are mixed in a ratio of 1:1;
   (c) preparing a mix base for ice cream and homogenizing it;
   (d) mixing said homogenized mix base with the mulberry leaf powder resulting from step (b) and flavors; and
   (e) aging the resulting mixture followed by freezing and thickening to give mulberry leaf powder containing ice cream.

4. A method for preparing mulberry leaf ice cream according to claim 3, wherein said drying in step (a) is executed either under a well-ventilated shade or in a drier at the temperature of 65–68° C. for the first 20–40 minutes and then at the temperature of 45–50° C. after emitting the residual moisture inside the drier.

5. A method for preparing mulberry leaf ice cream according to claim 3, wherein said pulverizing in step (a) is executed by using a ball mill or a jet mill.

6. A method for preparing mulberry leaf ice cream according to claim 3, wherein said homogenizing of the mix base in step (c) is performed under 10–200 kg/cm².

7. A method for preparing mulberry leaf ice cream according to claim 3, wherein said aging in step (e) is performed at the temperature of 1–10° C. for 1–20 hours.

8. A method for preparing mulberry leaf ice cream according to claim 3, wherein said freezing in step (e) is performed at the temperature of −4 to −8° C.

9. A method for preparing mulberry leaf ice cream according to claim 3, wherein said thickening in step (e) is performed at the rate of 10–200%.

* * * * *